HAROLD M. LANG
INVENTOR.

Feb. 24, 1970

H. M. LANG 3,497,287

SPATIAL FILTERING SYSTEM MINIMIZING IMAGE DEGRADATION
DUE TO DIFFRACTION AT THE FILTER

Filed Oct. 10, 1966

HAROLD M. LANG
INVENTOR.

BY Paul F. Hawley

ATTORNEY 3,497,287
Patented Feb. 24, 1970

3,497,287
SPATIAL FILTERING SYSTEM MINIMIZING IMAGE DEGRADATION DUE TO DIFFRACTION AT THE FILTER
Harold M. Lang, Tulsa, Okla., assignor to Pan American Petroleum Corporation, Tulsa, Okla., a corporation of Delaware
Filed Oct. 10, 1966, Ser. No. 585,461
Int. Cl. G02b 5/18
U.S. Cl. 350—162                          8 Claims

ABSTRACT OF THE DISCLOSURE

It is possible to filter optically data present in the form of a variable density transparency by illuminating it with coherent light and focusing this light to form an object. Between the transparency and the object across a plane transverse to the optical axis appears a pattern of light which constitutes the Fourier transform of the variable density data on the transparency. Any means (such as a mask interposed at this plane to change the illumination in this plane results in a filtering of the data and presentation on the image of a filtered version of the data on the transparency. This invention involves oscillating the masking means through a small amplitude vibration. This minimizes and usually eliminates the recording on the object of diffraction patterns formed around the edges of the masking means, which thus introduced error into any record, such as a photograph, made of this object. Preferably such oscillation is also accompanied by stroboscopic variation of the intensiy of illumination of the coherent light source, synchronous with the vibration. Preferably a photographic record is made of the resultant filtered object, the exposure being long enough to include several cycles of the vibration, which tends to average out the diffraction patterns produced at the masking edges.

This invention relates to the processing of data by optical means, more specifically, it is concerned with methods and apparatus for improving the quality of optical processing by reducing or eliminating spurious events due to unwanted diffraction products inherent in optical filtering.

In some methods of optically enhancing seismic data, undesirable features, which were unavoidably recorded with the valid data, may be removed by masking selected portions of an optical transform of an input data display. This procedure is effective by virtue of the fact that, in a Fourier transform of the input data display, elements are separated in a manner related to their frequency content and the angle of such events with respect to the $x$ and $y$ axes of the data display. For further details of optical data processing, see Dobrin, Milton B., "Velocity and Frequency of Seismic Data, Using Laser Light," Geophysics Volume XXX—No. 6, pp. 1144 et seq.

A typical display of seismic data consists of signals represented in variable density form arranged adjacent each other to form a chart representing a vertical cross section of a geologic features. While the variable density type display is advantageously adapted to optical processing, it is also sensitive to interference patterns generated by the masks introduced in the Fourier transform to attenuate selected seismic events.

The principal objective of the present invention is to teach a method of eliminating diffraction effects which degrade the image of the output data. The nature of these interfering images, together with methods and apparatus for eliminating them, will be explained and illustrated in detail as my invention is revealed.

Seismic data are obtained for the purpose of revealing subsurface structural elements as a step in the search for petroleum reserves is commonly displayed as a cross section through the earth. Acoustic waves, usually generated by a shot of dynamite detonated below the surface of the earth, are propagated downwardly through the successive structural elements of rock, sand and shale, marking their passage through each interface between dissimilar beds by reflecting back to the surface a fraction of their acoustic energy. At the earth's surface, seismometers responding to the resultant vibrations, generate electric analogs of the earth motion. Each such analog or signal represents the earth's motion at the location on which the seismometer is placed and is characterized by a succession of wavelets. Taken with respect to the time which has elapsed since the initating signal, dynamite or other acoustic source, these signals reveal depth and attitude of the structural features at that location. When these electrical signals are displayed in variable density form, that is, as a trace whose density varies as a funtcion of time in accordance with the seismic signal, they may be displayed adjacent each other to form a chart, the top of which represents the surface of the earth, with time (depth) increasing downward. The horizontal dimension across the chart represents distance along the earth's surface.

In addition to the valid data which is related to the depth and attiude of structural members, several types of spurious events may be intermixed and recorded with the useful information. Some of these events have unique characteristics which set them apart from true events. When the input data display, usually in the form of 35 mm. film transparency, is projected by optical means to generate a Fourier transform, undesirable features of the input data may be attenuated by placing masks of appropriate size and shape in the plane of this transform to block or filter portions of the beam which are produced by unwanted signals.

While this method of filtering has been found to be very effective and to permit the enhancement of seimic data in a rapid and efficient manner, it suffers from the disadvantage that any object placed in the Fourier plane will itself produce a pattern of diffraction images on the otherwise enhanced output image.

The Fourier transform of the input data section is generated in the optical system by Fraunhoffer diffraction. Such diffraction is characterized as that bending of an optical beam which occurs when both the light source and the image-forming plane are effectively at infinity. The optical equivalent of infinity in this sense is equivalent to parallel or collimated light. The alignment of variable density events on adjacent traces in effect forms a system of slits which deflect the light rays in accordance with their attitude and special frequency. Such deflected rays form a focused pattern around the central or undeflected portion of the light field. Objects introduced into this plane, usually to obstruct an unwanted portion, are no longer operating in a field of parallel light as was the input section. As this point, the light rays are not parallel but of such a nature that they produce a near-field or Fresnel-type diffraction as they pass the edge of the mask. This diffraction pattern related in shape to the object in the Fourier transform which has produced it, comes to a focus in the same plane as the output image and is superimposed upon it. Since both the valid seismic signal, representing subsurface beds, and the Fresnel diffraction pattern from the stages of masking devices in the Fourier plane are both represented in variable density form, the latter lends confusion to the data of the output section and, on occasions, may produce problems of interpretation which surmount those present in the original input section.

My invention serves to eliminate or to greatly reduce these Fresnel diffraction images, thereby producing a new and improved type of data display which is of great assistance to the data interpreter and, hence, to the search for petroleum reserves.

The more common types of obstructing filters introduced into the Fourier transform consist of blades or wires. The edge of a blade-type filter produces a Fresnel diffraction pattern. If two edges of a mask element are exposed in the Fourier transform, an energy distribution pattern will be formed in the output image plane.

Two characteristics of the Fresnel diffraction image are revealed which are of concern to this invention. The most prominent feature and the one which produces the major portion of the interference pattern in the output plane is the sharp rise and high amplitude of the first cycle. The second characteristic of this diffraction pattern is that the energy distribution forms a sinusoidal pattern which increases in spacial frequency and decreases in amplitude with distance from the initial lobe. The principal object of my invention is to reduce the effect of this type of diffraction patterns which are formed on the output image. This is accomplished by causing the diffraction image to move with respect to the output data image in a manner which produces a spacial averaging effect to reduce the otherwise prominent diffracted energy bands to a sufficiently low intensity as to render them essentially innocuous in the interpretation of the output data display. Movement of the diffraction image to produce this averaging effect may be produced in either of two ways. In the first, the mask of blades, wires or other similar obstructions placed in the Fourier transform plane are made to oscillate or vibrate during the recording interval of the output image. In the second method of producing this effect, a symmetrical filter, such as is used in seismic dip elimination, may be rotated in the Fourier plane while the light source illuminating the input data section is pulsed in a stroboscopic manner. By controlling the onset and decay of these light pulses, the rotating filter is permitted to move through a small angle during the time the light beam is permitted to increase from zero to maximum and during the corresponding decay period as the light decreases from maximum to zero. The latter system has the advantage over the former in that it not only eliminates the deleterious effect of Fresnel diffraction patterns in the output plane, but by modulating the light source to control both pulse duration and phase angle with respect to the filter rotation, the filter may be made to effectively block unwanted events at any selected angle of dip. Varying the duration of light pulses produces the effect of increasing or decreasing the sector angle of a rotating dip filter.

Another objective of my invention is to provide a method and apparatus to permit adjustment of dip angle and mask adjustment angle without the need of substituting filters in the course of optically processing an input data section. The manner in which these and other objectives are accomplished, apparent to one familiar with this method of data enhancement, will become apparent upon inspection of the figures and pursuit of the following description.

Figure 1:
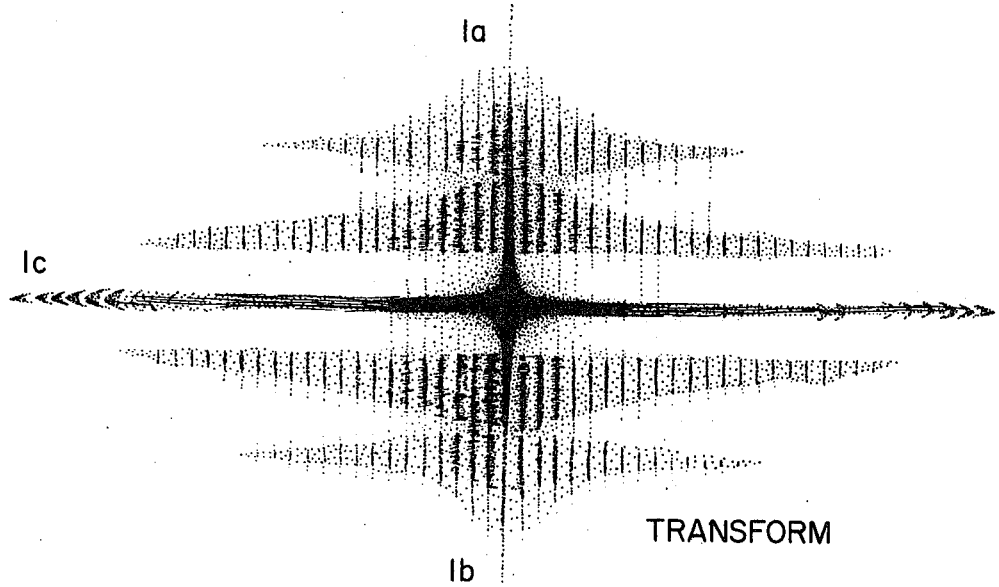
FIGURE 1 is a typical Fourier transform produced by a seismic data display.

In FIGURE 1 is shown the manner in which features of the input data section are separated in accordance with their spacial frequency and angle of dip in the plane of the Fourier transform. The upper and lower portions 1a and 1b, divided by the horizontal line 1c are essentially mirror images in which frequency increases with distance above or below the line 1c. The linear extent of the survey profile from which the seismic data were derived is represented by distance along the horizontal axis, 1c. No seismic events of significant dip are apparent in this transform.

Figure 3:
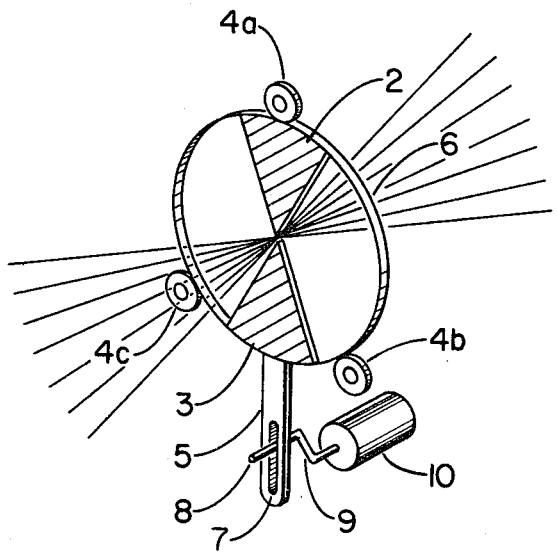
FIGURE 3 is a typical wedge-type filter used in the Fourier transform to eliminate events having selected angles of dip. Also shown is a means for oscillating this filter in a rotational sense.
Figure 4:
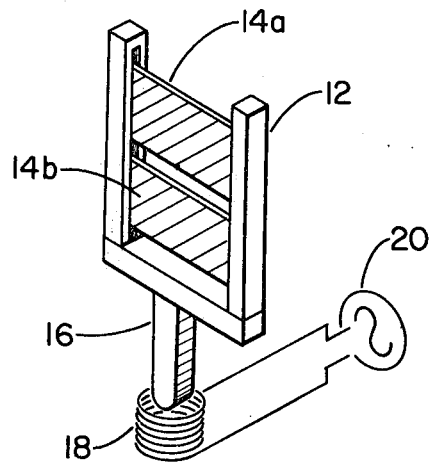
FIGURE 4 is a blade or slit-type filter used in the Fourier transform to eliminate selected frequency components of the input data. A means of vibrating this assembly in a vertical plane is also shown.

One embodiment of the present invention is illustrated by FIGURE 3 in which segments of a circular disk 2 and 3 are positioned in the plane of the Fourier transform. Angular adjustment of these wedges with respect to the axes of the transform is provided by rollers 4a, 4b and 4c. Lever 5 attached to blade-mounting ring 6 is provided with a slot 7. Pin 8 attached to crank 9 and extending into slot 7 produces an angular oscillating motion of ring 6 when rotated by motor 10. This assembly may be substituted for rotating mask 44, shown in FIGURE 5. FIGURE 4, typical of blade or highcut frequency masks used in the Fourier plane, consists of frame 12, which supports blades 14a and 14b. Magnetic armature 16 attached to frame 12 is extended into the magnetic field of solenoid 18. When solenoid 18 is energized by an alternating current from source 20, armature 16 and hence frame 12, together with blades 14a and 14b, are caused to oscillate in a vertical plane.

Figure 5:
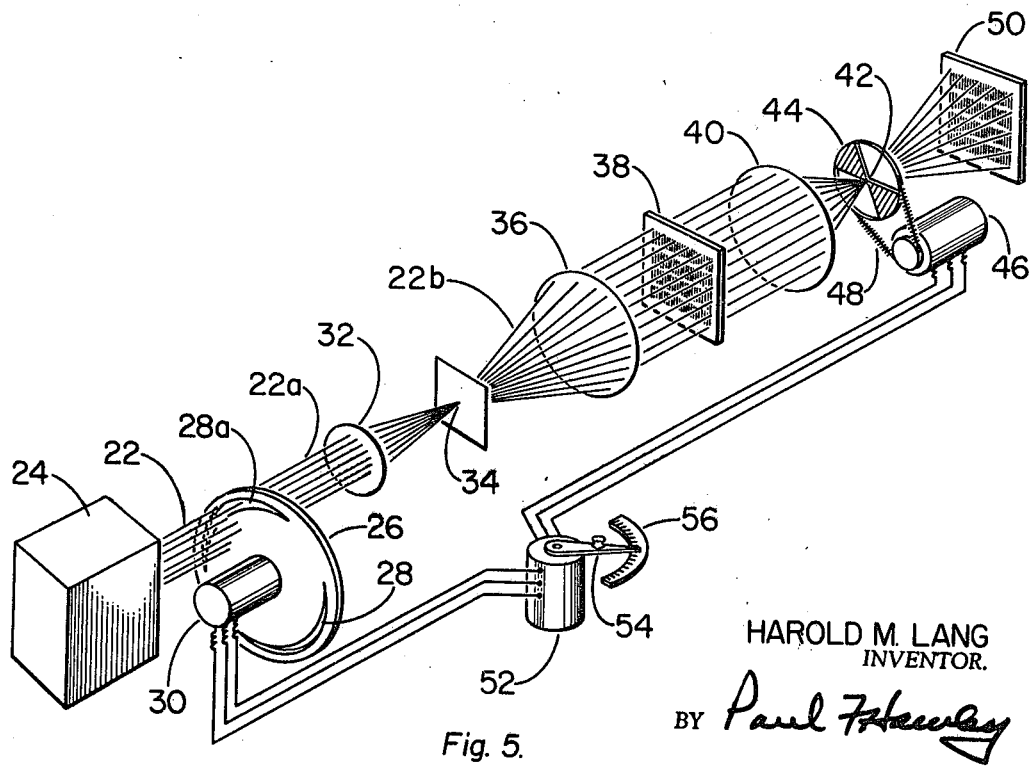
FIGURE 5 is an over-all schematic representation of an optical data processing system which illustrates one embodiment of the present invention.

The preferred embodiment of my invention is illustrated in FIGURE 5. In this embodiment light beam 22, emitted by laser 24, is directed through rotating disk 26, containing apertures 28 and 28a, disk 26 is rotated by motor 30. Beyond aperture 28 light beam 22a is focused by lens means 32 to pass through pin hole 34 and diverge to lens means 36 where the divergent rays of light beam 22b are collimated to form a bundle of parallel rays to pass through input data display film transparency 38, proceed to lens means 40, which forms a Fourier transform at 42. Filter means 44 is positioned in the transform plane in a manner to permit rotation by motor 46 communicating through timing belt 48. Light passing beyond filter 44 is imaged upon output recording medium 50.

The manner in which my invention operates to reduce or entirely eliminate the Fresnel image in the output display on recording medium 50 will be understood by considering the following relationships between rotating shutter 26 and rotating mask 44.

The speed at which rotating shutter 26 is operated is not of primary importance in carrying out this invention. However, it is advantageous that the shutter make at least several revolutions during the interval that the output image is being photographed on recording medium 50. Of prime importance, however, is the requirement that shutter 26 and filter 44 revolve synchronously, first in a simple one-to-one relationship, or where the speed of one is an integral multiple of the other. In my invention this rotational relationship is maintained by driving both the shutter 26 and the filter 44 by synchro motors 30 and 46, respectively, which are coupled together electrically through synchro differential transformer 52. It is inherent in the operation of synchro motors that their armatures rotate in a fixed relationship with respect to the rotation of at least a three-phase electrical winding which produces a rotating field within the motor. In the embodiment shown, shutter 26 and filter 44 rotate at identical speeds and are arranged with apertures and filter vanes respectively in bi-lateral symmetry. Thus, for each revolution of shutter 26 light beam 22 is permitted to pass during two intervals. Filter 44 rotating in synchronism occupies a given position for one aperture of shutter 26 and a position exactly 180° opposite the first for the second opening of shutter 26. The use of two apertures in shutter 26 is not essential to the operation but serves to permit exposure of the output plate 50 for a shorter time interval.

To achieve the desired effect of eliminating the Fresnel diffraction pattern from the output image, light apertures 28 and 28a are tapered from their full arcuate width to a point at either end of both apertures. In this way the movement of the shutter across the beam permits the intensity of light beam 22, taken at a point beyond the shutter, to increase gradually as the width of the aperture slit opens with the rotation of shutter 26. During this time that the intensity of the light beam 22 is increasing, filter 44 has moved several degrees of arc in the course of its synchronous rotation. Thus, an image of Fresnel diffraction is not generated on the output plate. Instead, the diffraction pattern generated by the edges of the sectors in filter 44 are caused to sweep out a corresponding arc on the output plate and thus their bands are to be averaged. Having been thus averaged, the intensity of the light flux at any point in this transition zone, which occurs while the light is being increased from zero to maximum, usually falls below the photographic threshold, hence no image is formed.

Further examination of the relationship between apertures 28, 28a and the sectors of filter 44 will reveal that as an aperture of shutter 26 permits passage of light beam 22, the entire transform occurs at 42, except for that portion occulted by the sectors of 44, the light beam passes unimpeded to form a reconstructed image of the input data at 50. Since shutter 26 and filter 44 rotate precisely in unison, this apparent position of the sectors of filter 44 will occur at the same point in the rotation of filter 44 with each succeeding revolution. In order that this angular position of the filter sectors may be positioned rotation-wise in accordance with the requirements of the input data under consideration, it is necessary that the phase angle of the rotation between shutter 26 and filter 44 be alterable. In my embodiment this is accomplished by connecting synchro motors 30 and 46 through synchro differential transformer 52. Synchro motors 30 and 46 are energized in the conventional manner by connecting a source of suitable alternating current to the rotor of both motors. In the transformer 52 the phase relationship between currents in synchro motors 30 and 46 may be altered by mechanically changing the rotational relationship between strator and rotor of this unit. This is accomplished by manually positioning lever 54 with respect to quadrant 56. Thus, taking as a reference the center of apertures 28 and 28a in shutter 26 by the use of phasing control 56, we may illuminate section 38 and generate transform 42 during a selected rotational angle of mask 44. Furthermore, by substituting for shutter 26 other shutters which have apertures of greater or lesser angular opening, we may sustain transform 42 while mask 44 moves through a greater or lesser angle of rotation. It will be seen that, in effect, this geometrical arrangement constitutes a stroboscopic system but which varies from the conventional stroboscopic system in that mask 44 may not only be made to appear stopped in its rotation, by the use of a very short shutter interval, but may also be made to serve as a mask in which the blades of mask 44 serve to block the transform throughout a greater angle than their own angular width. However, it will be noted that the angle of complete blocking extends only to that segment of the transform which is continuously obstructed by the mask from the beginning to the end of the light interval. In this way, the center of such an arc provides complete blocking of the beam while the segments on either side are only partially blocked since light passes during a portion of the shutter open interval.

Figure 2:
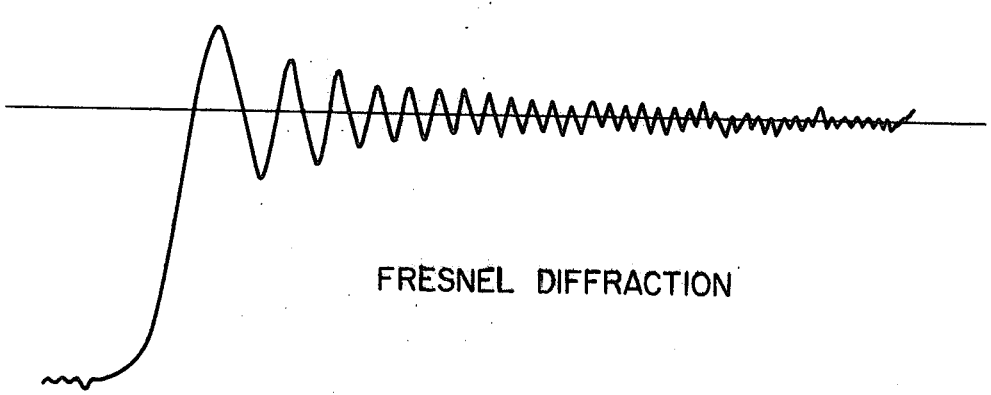
FIGURE 2 is an intensity distribution curve of the Fresnel diffraction pattern produced by the edge of a blade.

Two operational advantages are obtained by this mode of operation. The first of these is suppression of the Fresnel diffraction pattern which occurs at the output recording medium 50. Since this pattern consists of spacially displayed trains of sine waves, movement of the blade edges during exposure has the effect of averaging the light intensity between the troughs and crests of the sine waves in these trains such as typified by FIGURE 2. The average light intensity of the diffraction image at a given point on output section 50 is thus reduced to an intensity which, with proper photographic exposure, this Fresnel diffraction intensity may be made less than the exposure required to form an image on the recording medium.

The second advantage accruing from this stroboscobic method results from the fact that a mask such as 44 may be made to function as a mask having blades of variable angular extent. This feature permits the operator to study and evaluate the effect on the output section of filters of various sector angles without the need for substituting into the system a series of different filter masks.

Having explained the method and apparatus by which the advantages of my invention are obtained, I recognize that there are possible other embodiments of this invention which will be apparent to one skilled in the art. It is, therefore, my intention to include all such embodiments, variations and combinations which fall within the scope of my claims.

I claim:

1. An apparatus for attenuating diffraction products generated by objects positioned in the Fourier transform plane of optical data processing systems comprising the following elements:
   (a) a source of coherent monochromatic light,
   (b) a variable density transparency illuminated by said source,
   (c) at least one lens to focus light passing through said transparency to form an image, whereby there exists at a transverse plane between said transparency and said object an optical Fourier transform of said transparency,
   (d) optical means located at said transverse plane to mask a part of said transform, said part being defined by the edges of said optical means,
   (e) means to vibrate said optical means in said transverse plane through a small amplitude relative to the dimensions of said optical means in said transverse plane to minimize Fresnel diffraction from said edges, and
   (f) means to record said image.

2. Apparatus in accordance with claim 1, said means (e) vibrating said optical means substantially parallel to an optical axis of said Fourier transform in said transverse plane.

3. Apparatus in accordance with claim 1, said means (e) vibrating rotationally said optical means through a small angle relative to the angular dimensions of said optical means with the center of rotation substantially coincident with the optical center of said Fourier transform and the axis of rotation substantially perpendicular to said transverse plane.

4. In an optical data processing method in which a variable density transparency is illuminated by a substantially parallel beam of coherent monofrequency light and the resultant spatially modulated beam is focused to form an image, whereby there exists at a transverse plane between said transparency and said object an optical Fourier transform of said transparency, and in which optical filtering is provided by changing the illumination in the Fourier transform plane in a predetermined pattern, the improvement comprising modifying said pattern in said Fourier transform plane by inserting in said plane a mask (the edges of which define said pattern) partially obstructing said illumination pattern, and vibrating said mask in said plane through a small amplitude relative to the dimensions of said mask whereby the Fresnel diffraction pattern due to said edges is minimized.

5. A method in accordance with claim 4 including the step of recording said image during a period of time in which said mask moves through at least a plurality of vibrations.

6. In an optical data processing method in which a variable density transparency is illuminated by a substantially parallel beam of coherent mono-frequency light and the resultant spatially modulated beam is focused to form an image, whereby there exists at a transverse plane between said transparency and said object an optical Fourier transform of said transparency, and in which optical filtering is provided by changing the illumination in the Fourier transform plane in a predetermined pattern, the improvement comprising
modifying said pattern in said Fourier transform plane by inserting in said plane a mask which up to the edges thereof partially obstructs said illumination pattern, rotating said mask in said plane, and cyclically varying the intensity of said beam of light illuminating said transparency during each rotation of said mask stroboscopically such that the said intensity is substantially zero during a large part of each said rotation, increases gradually to a maximum between two predetermined angular positions of said mask of only small angular difference and decreases gradually substantially to zero between two other angular positions of said mask of only small angular difference, whereby the Fresnel diffraction pattern due to said edges is minimized.

7. A method in accordance with claim 6 including the step of recording said image during a period of time in which said mask moves through at least one revolution.

8. An apparatus for attenuating diffraction products generated by objects positioned in the Fourier transform plane of optical data processing systems comprising the following elements:
  (a) a source of coherent monochromatic light,
  (b) a variable density transparency illuminated by said source,
  (c) at least one lens to focus light passing through said transparency to form an image, whereby there exists at a transverse plane between said transparency and said object an optical Fourier transform of said transparency,
  (d) optical means located at said transverse plane to mask a part of said transform, said part being defined by the edges of said optical means,
  (e) means to rotate said optical means (d) in said transverse plane,
  (f) means synchronized with said rotating means (e) to vary the illumination from said source (a) during each revolution of said optical means (d) so that said illumination is appreciable only when said mask is oriented between predetermined positions and said illumination gradually changes from minimum to maximum and from maximum to minimum upon small angular rotations of said optical means (d), whereby the Fresnel diffraction pattern due to said edges is minimized, and
  (g) means to record said image during at least one revolution of said optical means (e).

References Cited
UNITED STATES PATENTS 2,544,116  3/1951  Waller et al. _____ 352—71
3,305,834  2/1967  Cooper et al. _____ 350—162

DAVID SCHONBERG, Primary Examiner

R. J. STERN, Assistant Examiner

U.S. Cl. X.R.

340—15.5; 350—6